(12) United States Patent
Abe

(10) Patent No.: US 6,489,747 B2
(45) Date of Patent: *Dec. 3, 2002

(54) BATTERY POWER SUPPLY WITH FACILE ALIGNMENT OF BATTERY MODULE TERMINALS

(75) Inventor: Kunihiro Abe, Tokyo (JP)

(73) Assignee: Fuji Jukogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/556,633

(22) Filed: Apr. 24, 2000

(65) Prior Publication Data

US 2002/0070704 A1 Jun. 13, 2002

(30) Foreign Application Priority Data

Apr. 23, 1999 (JP) .......................... 11-117098

(51) Int. Cl.[7] .................................. H02J 7/00
(52) U.S. Cl. ..................................... 320/112
(58) Field of Search ................ 320/107, 112; 429/99, 100, 157, 159

(56) References Cited

U.S. PATENT DOCUMENTS

| | | | | |
|---|---|---|---|---|
| 4,065,603 A | * | 12/1977 | Coibion | 429/99 |
| 5,200,280 A | * | 4/1993 | Karasa | 429/159 |
| 5,227,267 A | * | 7/1993 | Goebel et al. | 429/161 |
| 5,663,008 A | * | 9/1997 | Shimakawa et al. | 429/99 |
| 5,766,801 A | * | 6/1998 | Inoue et al. | 429/99 |
| 5,800,942 A | * | 9/1998 | Hamada et al. | 429/148 |
| 5,886,501 A | * | 3/1999 | Marks et al. | 320/112 |
| 6,097,173 A | * | 8/2000 | Bryant, Jr. | 320/107 |
| 6,111,387 A | * | 8/2000 | Kouzu et al. | 320/107 |
| 6,186,831 B1 | * | 2/2001 | Tsai | 439/627 |

FOREIGN PATENT DOCUMENTS

JP          10270006          10/1998

* cited by examiner

*Primary Examiner*—Gregory J. Toatley, Jr.
*Assistant Examiner*—Pia Tibbits
(74) *Attorney, Agent, or Firm*—Martin A. Farber

(57) ABSTRACT

Disclosed is a battery power supply comprising battery modules each having a plurality of cells electrically and mechanically connected together in a line; a battery case for holding the battery modules; end plates, respectively provided at both end portions of the battery case, for electrically connecting positive and negative terminals provided at both ends of each of the battery modules, the positive and negative terminals having same or similar shapes, but different sizes; and terminal receiving portions which are provided at the end plates and in which the positive and negative terminals at the both ends of each of the battery modules are fitted. This structure can facilitate attaching of the battery modules to the battery case without misattachment of both terminals of each battery module, thus resulting in a reduced number of assembling steps.

5 Claims, 5 Drawing Sheets

BATTERY POWER SUPPLY WITH FACILE ALIGNMENT OF BATTERY MODULE TERMINALS

BACKGROUND OF THE INVENTION

1. Field of the Invention

The present invention relates to a battery power supply in which its battery modules can easily be attached to the battery case.

2. Description of the Related Art

There is a known battery power supply which is used as a motor driving power supply for an electric vehicle or a hybrid vehicle. This battery power supply comprises multiple battery modules each of which has a line of cells electrically and mechanically connected together in series and which are housed in a battery case and are electrically connected in series to provide the necessary voltage and current.

With regard to such prior art, for example, Japanese Unexamined Patent Publication (KOKAI) No. 10-270006 discloses a technique of designing terminals at both ends of each battery module to have polygonal shapes with different numbers of polygons or forming recessed terminal receiving portions with the same shapes in which the terminals are fitted, thereby preventing misattachment of the positive and negative terminals at the time of attaching the battery modules to the battery case.

According to the prior art, the positive terminal of each battery module has a square shape and the negative terminal has a regular hexagonal shape. Even with one terminal fitted into the recessed terminal receiving portion of the associated end plate, therefore, the other terminal may not be fitted in the recessed terminal receiving portion of the associated end plate.

Specifically, as the positive terminal has a square shape, the angle of fitting becomes 90°, whereas the negative terminal has a hexagonal shape so that the fitting angle becomes 60°. Therefore, the position where both terminals can be fitted at the same time is limited to once every 180° and necessitates that both terminals should be fitted at the time of attaching the battery modules to the battery case while checking the rotational angles of the terminals. This makes the assembling work troublesome, thus leading to a poor working efficiency, and makes the automation of the assembling work difficult to achieve.

SUMMARY OF THE INVENTION

Accordingly, it is an object of the present invention to provide a battery power supply which facilitates the attachment of the battery modules to the battery case without misattachment of both terminals of each battery module, reduces the number of assembling steps and ensures an easier automation of the assembling work.

To achieve the above object, according to the first aspect of this invention, there is provided A battery power supply comprising battery modules each having a plurality of cells electrically and mechanically connected together in a line; a battery case for holding the battery modules; end plates, respectively provided at both end portions of the battery case, for electrically connecting positive and negative terminals provided at both ends of each of the battery modules, the positive and negative terminals having same or similar shapes; and terminal receiving portions which are provided at the end plates and in which the positive and negative terminals at the both ends of each of the battery modules are fitted.

According to the battery power supply of the first aspect of this invention, the positive and negative terminals of each of the battery modules may have circular shapes.

According to the battery power supply of the first aspect of this invention, the positive and negative terminals of each of the battery modules may have regular polygonal shapes.

According to any of the above-described battery power supplies, a guide face for guiding at least one of the positive and negative terminals of each of the battery modules may be formed at an insertion mouth of the associated terminal receiving portion.

According to the second aspect of this invention, there is provided a battery power supply comprising battery modules each having a plurality of cells electrically and mechanically connected together in a line; a battery case for holding the battery modules; end plates, respectively provided at both end portions of the battery case, for electrically connecting positive and negative terminals provided at both ends of each of the battery modules, the positive and negative terminals having similar shapes; and terminal receiving portions, provided at the end plates, for receiving the positive and negative terminals of each of the battery modules, the terminal receiving portions having shapes matched with that of a larger one of the positive and negative terminals.

According to the battery power supply of the second aspect of this invention, a guide face for guiding at least one of the positive and negative terminals of each of the battery modules may be formed at an insertion mouth of the associated terminal receiving portion.

In any of the battery power supplies associated with the first aspect of this invention, screw holes of different diameters are formed in end faces of the positive and negative terminals provided at the both ends of each of the battery modules; and insertion holes matched with the screw holes are bored in the terminal receiving portions on which the end faces of the positive and negative terminals abut. In this case, the positive and negative terminals of each of the battery modules have similar shapes; that one of the screw holes which has a larger diameter is formed in the end face of that one of the positive and negative terminals which has a smaller shape; and the other screw hole which has a smaller diameter is formed in the end face of the other one of the positive and negative terminals which has a larger shape.

In any of the battery power supplies associated with the second aspect of this invention, screw holes of different diameters may be formed in end faces of the positive and negative terminals provided at the both ends of each of the battery modules; and insertion holes matched with the screw holes are bored in the terminal receiving portions on which the end faces of the positive and negative terminals abut. In this case, that one of the screw holes which has a larger diameter is formed in the end face of that one of the positive and negative terminals which has a smaller shape; and the other screw hole which has a smaller diameter is formed in the end face of the other one of the positive and negative terminals which has a larger shape.

DETAILED DESCRIPTION OF THE PREFERRED EMBODIMENTS

Preferred embodiments of the present invention will now be described with reference to the accompanying drawings.

First Embodiment

FIGS. 1 through 4 illustrate the first embodiment of this invention.

Figure 1:
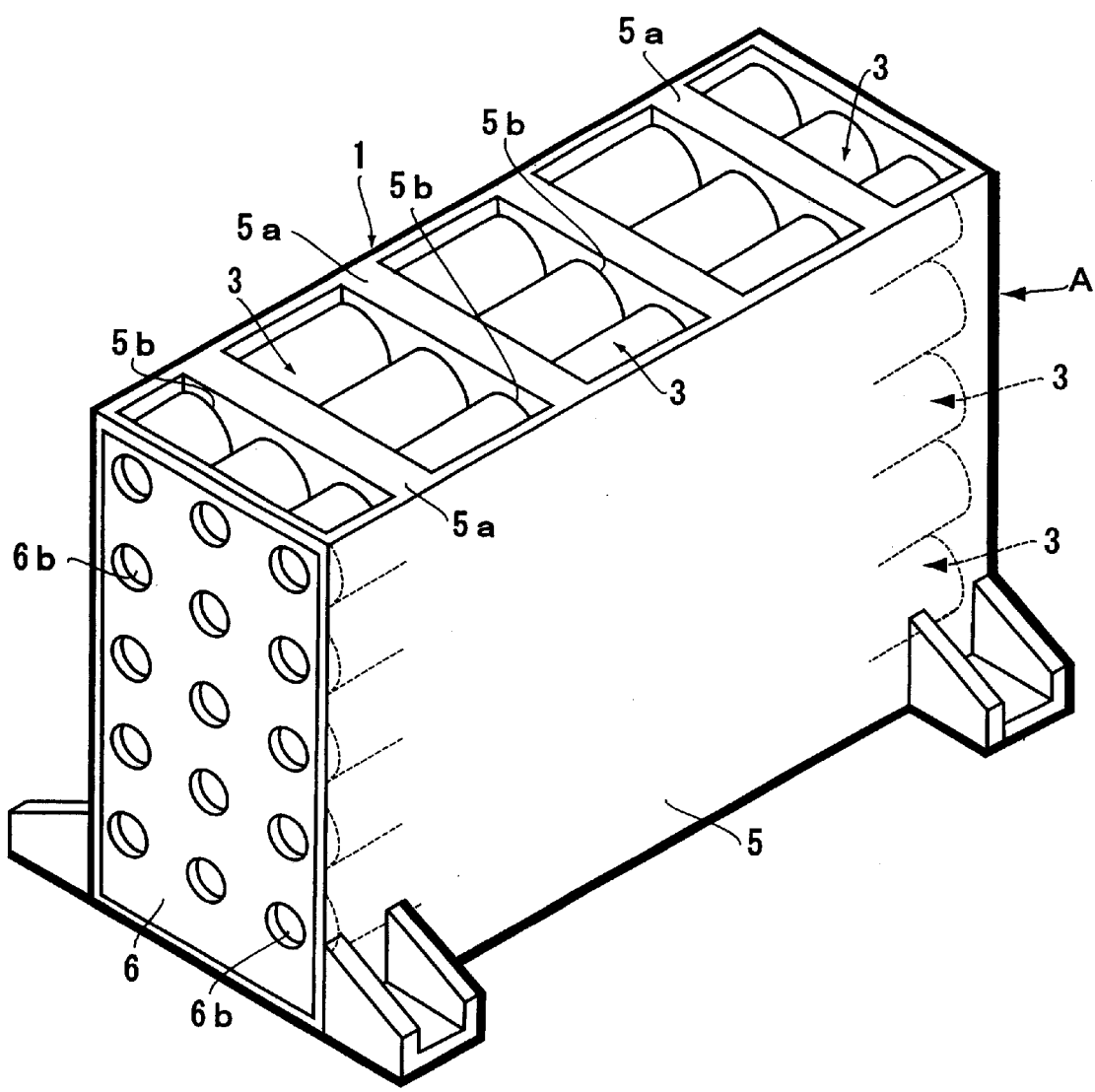
FIG. 1 is a perspective view of a battery case according to a first embodiment of this invention.
Figure 2:
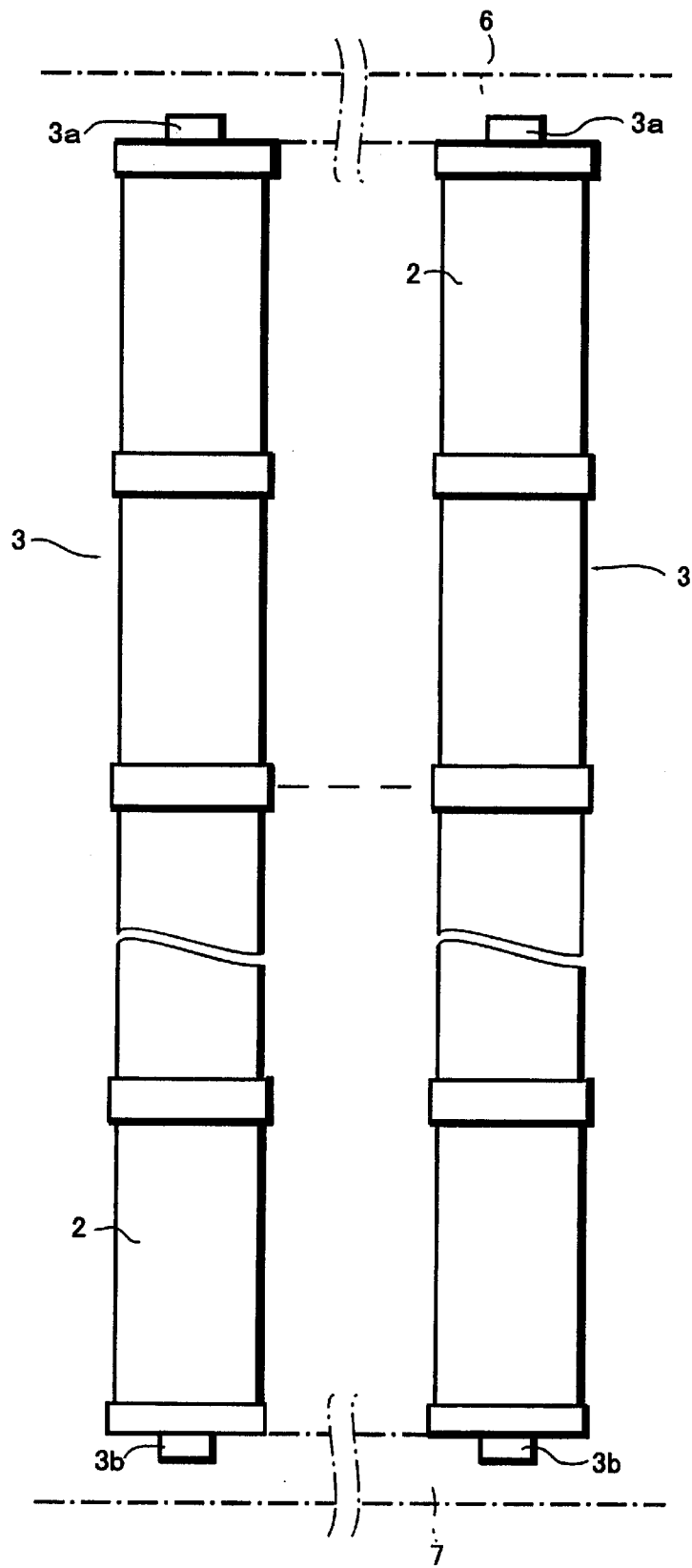
FIG. 2 is a plan view of battery modules according to the first embodiment.

FIG. 1 is a perspective view of a battery power supply A according to the first embodiment, which is to be installed in an electric vehicle, a hybrid vehicle or the like. This battery power supply A has a battery case 1 which accommodates a power source for driving an electric motor.

As the power source, a secondary battery of, for example, a nickel-hydrogen battery is used. The battery case 1 accommodates a plurality of battery modules 3 (5×3 battery modules in this embodiment) arranged abreast, each having a line of cells 2 (unit cells of the secondary battery) electrically and mechanically connected together in series. The individual battery modules 3 are connected in series to one another, so that a high voltage can be supplied to an electric motor.

Figure 3:
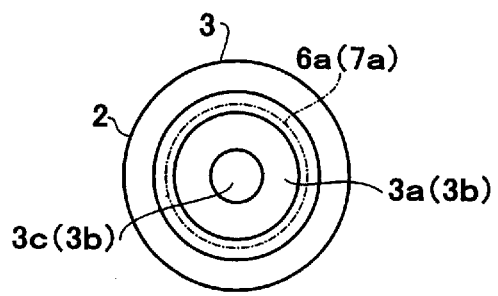
FIG. 3 is a side view showing terminals provided on each battery module according to the first embodiment.

The outer surface of each battery module 3 is covered with an armor tube (not shown) of a resin of polyvinyl chloride or the like, which has a dielectric and thermal shrinking property. A positive terminal 3a and a negative terminal 3b are protrusively provided on the respective ends of the battery module 3. As shown in FIG. 3, both terminals 3a and 3b are formed in circular shapes of the same diameter with screw holes 3c and 3d respectively threaded in their center portions.

The battery case 1 has a case body 5 with the top and bottom and lengthwise sides open, and left and right end plates 6 attached to the associated, open lengthwise sides. Partitions 5a are arranged at predetermined pitches in the case body 5. Insertion holes or spaces 5b for holding the individual battery modules 3 abreast are bored through each partition 5a at predetermined positions.

Figure 4:
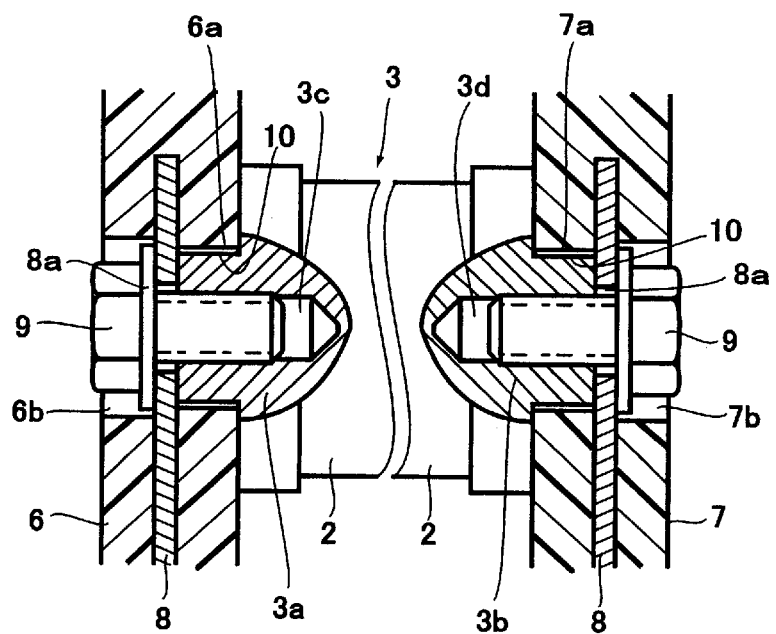
FIG. 4 is a partly cross-sectional plan view showing the battery modules secured to end plates according to the first embodiment.

As shown In FIG. 4, bus bars 8 which connect the cells 2 between the terminal 3a and 3b of each battery module 3 are inserted in the end plates 6 and 7 which are formed by resin molding. Circular recessed terminal receiving portions 6a and 7a in which the terminals 3a and 3b of each battery module 3 are to be respectively fitted are formed in the inner walls of the end plates 6 and 7 at positions corresponding to those terminals 3a and 3b. Fastening recesses 6b and 7b which receive the heads of bolts 9 are formed in the outer walls of the end plates 6 and 7 at positions corresponding to the recessed terminal receiving portions 6a and 7a. Insertion holes or openings 8a through which the bolts 9 are inserted are formed in each bus bar 6 located between the terminal receiving portion 6a (7a) and the associated fastening recess 6b (7b).

The assembling of the battery power supply A according to this embodiment will now be described. First, one of the end plates 6 and 7 is removed from the battery case 5 to open one side of the battery case 5. For easier understanding of the work, let us assume that the end plate 7 is removed. Each battery module 3 is put inside the battery case 5 from the open side and is inserted through the insertion space 5b formed in the partitions 5a and the terminal 3a (3b) protruding from the distal end of the battery module 3 is fitted in the recessed terminal receiving portion 6a (7a) formed in the end plate 6 (7) that is secured to the opposite side of the battery case 5.

Thereafter, the removed end plate 7 (6) is secured to the open side of the battery case 5 and the terminal 3b (3a) protruding from the rear end of the battery module 3 is fitted in the recessed terminal receiving portion 7a (6a) formed in the end plate 7 (6).

As both terminals 3a and 3b have circular shapes of the same diameter, the positional alignment in the axial rotational direction is unnecessary at this time, resulting in an excellent workability.

Then, the bolts 9 are driven into the screw holes 3c and 3d, formed in the terminals 3a and 3b, through the insertion holes 8a formed in the bus bars 8 that are inserted in the end plates 6 and 7, thereby fastening the terminals 3a and 3b to the bus bars 8.

As apparent from the above, because the positive terminal 3a and negative terminal 3b at the respect ends of each battery module 3 are designed to have circular shapes of the same diameter in this embodiment, no positional alignment in the axial rotational direction is needed at the time of fitting the terminals 3a and 3b to the end plates 6 and 7. This can ensure a higher workability and reduce the number of assembling steps. It is therefore possible to eliminate the need for the accurate angular alignment in the axial rotational direction prior to the attachment and facilitate automation of the assembling work. This automation can lead to a significant reduction in the number of assembling steps.

Second Embodiment

Figure 5:
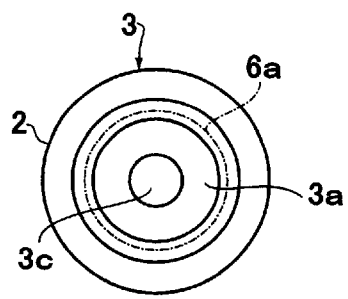
FIGS. 5A and 5B front views of terminals provided on a battery module according to a second embodiment of this invention.
Figure 5:
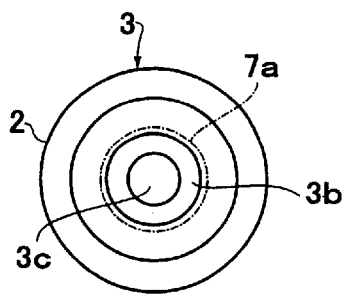

FIGS. 5A and 5B show the second embodiment of this invention, which is a modification of the first embodiment and wherein the positive and negative terminals 3a and 3b are formed to have different diameters.

If the positive and negative terminals 3a and 3b have the same diameter, those terminals 3a and 3b may be attached to the wrong sides at the time of attaching each battery module to the battery case. As a solution to this shortcoming, the terminals 3a and 3b are so designed as to have different diameters in the second embodiment.

Specifically, the diameter of the negative terminal 3b is made smaller than that of the positive terminal 3a and the diameters of the recessed terminal receiving portions 6a and 7a formed in the end plates 6 and 7 are modified to match with those of the respective terminals 3a and 3b. As a result, even if someone tries to erroneously fit the positive terminal 3a in the recessed terminal receiving portion 7a formed in the right end plate 7, the positive terminal 3a will not be fitted in the recessed terminal receiving portion 7a because of the diameter of the terminal receiving portion 7a being smaller than that of the positive terminal 3a. This can therefore prevent misattachment of both terminals of each battery module.

The diameters of both terminals 3a and 3b are so set as to be distinguished from each other at a glance.

Third Embodiment

Figure 6:
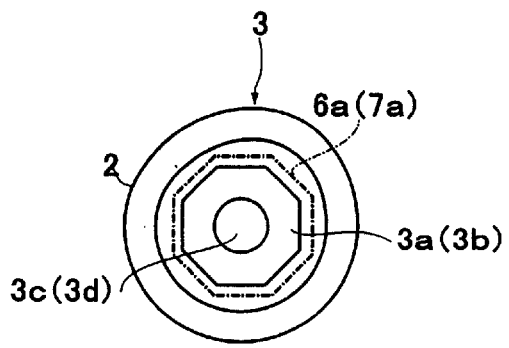
FIG. 6 is a front view of terminals provided on a battery module according to a third embodiment of this invention.

FIG. 6 shows the third embodiment of this invention. This embodiment is a further modification of the first embodiment wherein both terminals 3a and 3b are formed to have the same regular polygonal shape, such as an octagonal shape, and the recessed terminal receiving portions 6a and 7a in which the terminals 3a and 3b are to be fitted are designed to have shapes corresponding to those of the terminals 3a and 3b.

As both terminals 3a and 3b have regular polygonal shapes and the recessed terminal receiving portions 6a and 7a in which the terminals 3a and 3b are to be fitted have corresponding polygonal shapes, the positional alignment of the battery module 3 in the axial rotational direction can be carried out every rotational angle defined by the number of polygons of the regular polygonal shape. Further, this particular shape can serve to stop the rotation of the terminals 3a and 3b fitted in the recessed terminal receiving portions 6a and 7a at the time they are fastened by the bolts.

Fourth Embodiment

Figure 7:
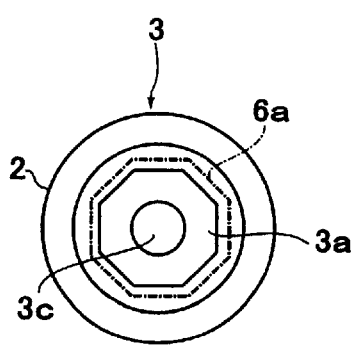
FIGS. 7A and 7B are front views of terminals provided on a battery module according to a fourth embodiment of this invention.
Figure 7:
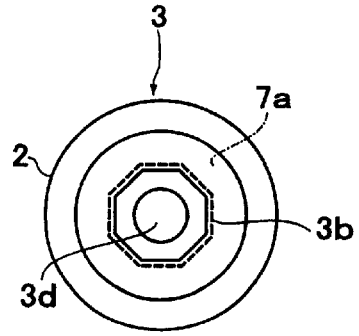

FIGS. 7A and 7B show the fourth embodiment of this invention. FIG. 7A is a front view of the positive terminal 3a, and FIG. 7B a front view of the negative terminal 3b.

This embodiment is a modification of the third embodiment wherein the polygonal positive and negative terminals 3a and 3b have similar shapes. In this embodiment, the negative terminal 3b has a smaller shape than the positive terminal 3b.

Designing terminals 3a and 3b to have similar shapes can prevent the larger terminal 3a from being fitted in the smaller recessed terminal receiving portion 7a, thereby inhibiting misattachment of both terminals 3a and 3b of each battery module. It is to be noted that the shapes of both terminals 3a and 3b are so designed as to be distinguished from each other at a glance.

Fifth Embodiment

Figure 8:
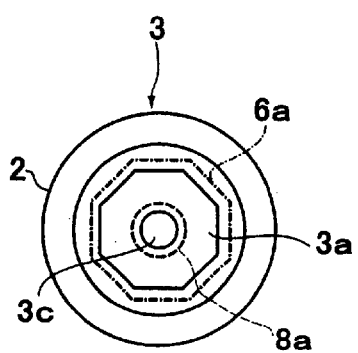
FIGS. 8A and 8B are front views of terminals provided on a battery module according to a fifth embodiment of this invention.
Figure 8:
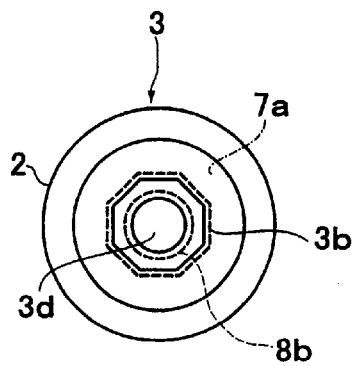

FIGS. 8A and 8B show the fifth embodiment of this invention. FIG. 8A is a front view of the positive terminal 3a, and FIG. 8B a front view of the negative terminal 3b.

This embodiment is a modification of the fourth embodiment wherein the diameters of the screw holes 3c and 3d which are to be threaded in the respective terminals 3a and 3b differ from each other in such a way that the screw hole 3c for the larger terminal 3a is made smaller than the screw hole 3d for the smaller terminal 3b. Further, the insertion holes 8a formed in the bus bars 8 have dimensions corresponding to the associated screw holes 3c and 3d.

According this embodiment, if the smaller terminal 3b is erroneously fitted in the larger recessed terminal receiving portion 6a, the diameter of the screw hole 3d becomes larger than the diameter of the mating insertion openings 8a so that the misattachment can be quickly detected at a glance.

Sixth Embodiment

Figure 9:
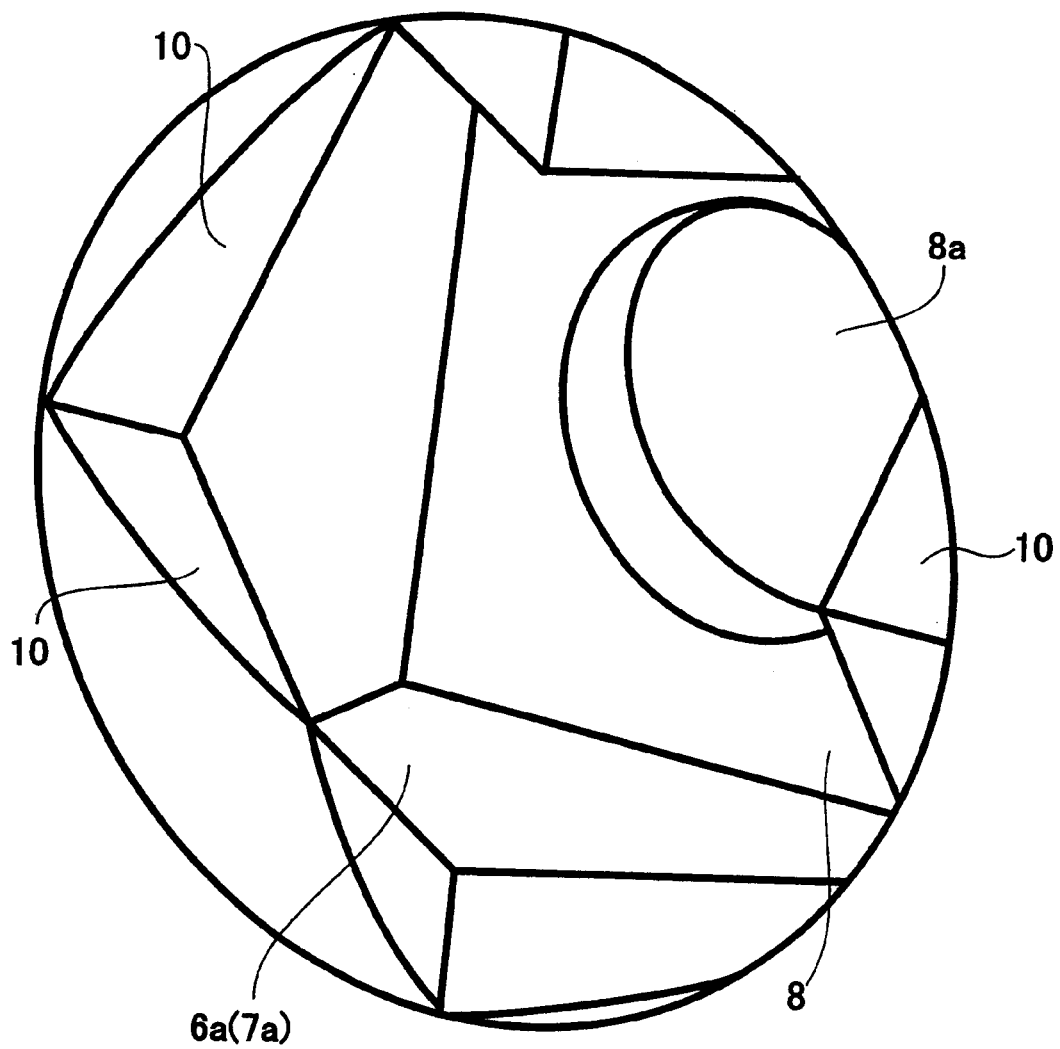
FIG. 9 is a perspective view showing recessed terminal receiving portions according to a sixth embodiment of this invention.

FIG. 9 is a perspective view showing the recessed terminal receiving portion 6a (7a) according to the sixth embodiment of this invention. This embodiment is a modification of the second to fourth embodiments wherein terminal guide faces 10 are formed at the opening portion of the recessed terminal receiving portion 6a (7a).

Although the recessed terminal receiving portion 6a (7a) has a square shape in this embodiment, this shape is not restrictive and can be any regular polygonal shape.

Each terminal guide face 10 rises in a slope while spreading from the associated corner portion of the recessed terminal receiving portion 6a (7a), so that a ridge line is formed between the terminal guide face 10 and the adjoining terminal guide face 10 at the opening portion of the recessed terminal receiving portion 6a (7a).

According to this embodiment, if the axial rotational direction of the terminal having a square shape is not aligned with the recessed terminal receiving portion 6a (7a) when the terminals formed at the both ends of each battery module put closer to the recessed terminal receiving portions 6a and 7a, the corners of the terminal abut on the terminal guide faces 10 and rotate along the slopes to be fitted in the recessed terminal receiving portion 6a (7a).

Even if the terminals of each battery module are not aligned with the recessed terminal receiving portions 6a and 7a in the axial rotational direction, therefore, the positional alignment in the axial rotational direction is automatically made without requiring visual confirmation. This leads to an improved assembling work.

According to one aspect of this invention, as described above, the positive and negative terminals formed at the respect ends of each battery module are designed to have same or similar shapes, so that when one terminal is fitted to the terminal receiving portion formed in the mating end plate at the time of attaching this battery module to the battery case, the other terminal is always fitted in the terminal receiving portion formed in the other end plate. This can improve the workability and reduce the number of assembling steps. Further, the accurate angular alignment in the axial rotational direction prior to the attachment becomes easier, thus facilitating automation of the assembling work, which can significantly decrease the number of assembling steps.

In this case, if the shapes of the terminals provided at both ends of each battery module are made circular, it is possible to eliminate the need for the positional alignment in the axial rotational direction at the time of attaching the battery module to the battery case. This ensures a higher workability.

If the terminals provided at both ends of each battery module are made to have regular polygonal shapes, it is possible to make the positional alignment in the axial rotational direction every rotational angle defined by the number of polygons of the regular polygonal shape at the time of attaching the battery module to the battery case.

According to one modification, the positive and negative terminals formed at the respect ends of each battery module are designed to have similar shapes and the terminal receiving portions provided on the end plates are designed to match with the shape of the larger terminal. Therefore, the positional alignment can be accomplished merely by fitting the larger terminal of the battery module into the terminal receiving portion provided on the mating end plate. This can ensure an excellent workability.

In this case, if a guide face for guiding at least one of the positive and negative terminals provided at the respective ends of each battery module is formed at the insertion mouth of the associated terminal receiving portion, the terminal is guided along the guide surface to the associated terminal receiving portion at the time of attaching the battery module to the battery case. This ensures a higher workability.

According to another modification, screw holes of different diameters are threaded in the terminals provided at the respective ends of each battery module and insertion holes which match with the screw holes are formed in the terminal receiving portions at the positions where the end faces of the terminals abut. This allows a work to adequately grasp the alignment of the terminals of the battery module with the associated terminal receiving portions provided on the end plates.

In this case, if both terminals are designed to have similar shapes and a screw hole which has a larger diameter is threaded in the smaller terminal and a screw hole which has a smaller diameter is threaded in the larger terminal, it becomes possible to allow a worker to easily and visually confirm the direction of the attachment of the terminals of each battery module. This can further improve the assembling efficiency.

Although several embodiments of the present invention have been described herein, it should be apparent to those skilled in the art that the present examples and embodiments are to be considered as illustrative and not restrictive and the invention is not to be limited to the details given herein, but may be modified within the scope of the appended claims.

What is claimed is:

1. A storage battery unit (A), comprising;
   a number of battery modules (3) each consisting of a row of a plurality of single cells (2) connected electrically and mechanically in series, and each battery module having a positive terminal (3a) at one end of the module and a negative terminal (3b) at the other end of the module;
   a battery case (1) provided to hold said battery modules (3);
   end plates (6,7) positioned at opposite ends of said battery case (1), and each of the end plates having terminal receiving portions (6a,7a) to respectively receive said terminals (3a,b) of a battery module; and
   bus bars (8) respectively inserted in said end plates (6, 7) to effect electrical connection between said terminals (3a,b) of respective ones of said battery modules;
   wherein, in an individual one of said modules, said positive terminal (3a) and said negative terminal (3b) are shaped with the same configuration but with different sizes from each other, and said terminal receiving portions (6a,7a) are shaped and sized to fit the corresponding ones of the terminals (3a,b).

2. The storage battery unit(A) according to claim 1, wherein:
   each of said terminal receiving portions (6a,7a) has a guide face (10) at an insertion mouth thereof for guiding a corresponding terminal (3a,b) of each of said battery modules (3).

3. The storage battery unit (A) according to claim 1, wherein:
   in an individual one of said modules, said positive terminal (3a) and said negative terminal (3b) have screw holes (8a) in respective end faces thereof to fasten said terminals (3a,b) to said bus bars (8) with bolts, the screw hole of said positive terminal being of different size from the screw hole of said negative terminal, and said bus bars (8) are provided with insertion openings matched in configuration and size with the corresponding screw holes (8a).

4. The storage battery unit (A) according to claim 3, wherein:
   said screw holes (8a) for the larger terminals (3a,b) are made with a smaller hole than that of said screw holes (8a) for the smaller terminals (3a,b).

5. A storage battery unit (A), comprising:
   a number of battery modules (3) each consisting of a row of a plurality of single cells (2) connected electrically and mechanically in series, and each battery module having a positive terminal (3a) at one end of the module and a negative terminal (3b) at the other end of the module;
   a battery case (1) provided to hold said battery modules (3);
   end plates (6,7) positioned at opposite ends of said battery case (1), and each of the end plates having terminal receiving portions (6a, 7a) to respectively receive said terminals (3a,b) of a battery module; and
   bus bars (8) respectively inserted in said end plates (6,7) to effect electrical connection between said terminals (3a,b) of respective ones of said battery modules;
   wherein said positive terminal (3a) and said negative terminal (3b) of one of said modules are shaped with the same configuration but with different sizes from each other, and said terminal receiving portions (6a,7a) are shaped and sized with corresponding shapes and sizes to fit corresponding ones of said positive terminal (3a) and said negative terminal (3b).

* * * * *